United States Patent
Kibune et al.

(10) Patent No.: US 11,138,505 B2
(45) Date of Patent: Oct. 5, 2021

(54) QUANTIZATION OF NEURAL NETWORK PARAMETERS

(71) Applicant: FUJITSU LIMITED, Kawasaki (JP)

(72) Inventors: Masaya Kibune, Santa Clara, CA (US); Xuan Tan, Sunnyvale, CA (US)

(73) Assignee: FUJITSU LIMITED, Kawasaki (JP)

(*) Notice: Subject to any disclaimer, the term of this patent is extended or adjusted under 35 U.S.C. 154(b) by 958 days.

(21) Appl. No.: 15/851,258

(22) Filed: Dec. 21, 2017

(65) Prior Publication Data
US 2019/0197408 A1 Jun. 27, 2019

(51) Int. Cl.
*G06N 3/08* (2006.01)
*G06N 3/04* (2006.01)
*G06N 3/063* (2006.01)

(52) U.S. Cl.
CPC ............... *G06N 3/084* (2013.01); *G06N 3/04* (2013.01); *G06N 3/0481* (2013.01); *G06N 3/063* (2013.01); *G06N 3/082* (2013.01)

(58) Field of Classification Search
CPC ........ G06N 3/084; G06N 3/04; G06N 3/0481; G06N 3/082; G06N 3/063
See application file for complete search history.

(56) References Cited

U.S. PATENT DOCUMENTS

| | | | | |
|---|---|---|---|---|
| 5,822,742 A * | 10/1998 | Alkon | ............... | G06K 9/4628 706/31 |
| 8,862,527 B2 * | 10/2014 | Garner | ............... | G06N 3/088 706/25 |
| 9,406,017 B2 * | 8/2016 | Hinton | ............... | G06N 3/082 |
| 10,643,705 B2 * | 5/2020 | Choi | ............... | G11C 16/08 |
| 2016/0179434 A1 * | 6/2016 | Herrero Abellanas | | G06F 3/0644 711/155 |
| 2016/0321784 A1 * | 11/2016 | Annapureddy | ........ | G06N 3/082 |
| 2016/0328645 A1 * | 11/2016 | Lin | ............... | G06N 20/00 |
| 2017/0103304 A1 * | 4/2017 | Henry | ............... | G06N 3/04 |
| 2017/0132496 A1 * | 5/2017 | Shoaib | ............... | G06K 9/66 |
| 2017/0169327 A1 * | 6/2017 | Nestler | ............... | G06N 3/0635 |
| 2017/0221176 A1 * | 8/2017 | Munteanu | ............... | G06T 1/60 |
| 2017/0236053 A1 * | 8/2017 | Lavigueur | ............... | G06N 3/063 706/31 |
| 2017/0255859 A1 * | 9/2017 | Tan | ............... | G06N 3/02 |
| 2017/0323198 A1 * | 11/2017 | Tan | ............... | G06N 3/08 |
| 2018/0032860 A1 | 2/2018 | Tan et al. | | |

OTHER PUBLICATIONS

Delmas, A., et al, Dynamic Stripes: Exploiting the Dynamic Precision Requirements of Activation Values in Neural Networks [online], 2017 [retrieved on Dec. 28, 2020]. Retrieved from the Internet:<URL:https://arxiv.org/pdf/1706.00504.pdf>(Year: 2017).*

(Continued)

*Primary Examiner* — Miranda M Huang
*Assistant Examiner* — Bart I Rylander
(74) *Attorney, Agent, or Firm* — Maschoff Brennan

(57) ABSTRACT

A method of generating a neural network may be provided. A method may include applying non-linear quantization to a plurality of synaptic weights of a neural network model. The method may further include training the neural network model. Further, the method ma include generating a neural network output from the trained neural network model based on or more inputs received by the trained neural network model.

14 Claims, 8 Drawing Sheets

(56) References Cited

OTHER PUBLICATIONS

Suyog Gupta, "Deep Learning with Limited Numerical Precision", IBM, Feb. 9, 2015.
Darryl D. Lin, "Fixed Point Quantization of Deep Convolutional Networks", Qualcomm Research, Jun. 19, 2016.
Song Han, "Learning both Weights and Connections for Efficient Neural Networks", Nvidia, Dec. 7, 2015.
Daisuke Miyashita, "Convolutional Neural Networks using Logarithmic Data Representation", Stanford University, Mar. 17, 2016.

* cited by examiner

QUANTIZATION OF NEURAL NETWORK PARAMETERS

FIELD

The embodiments discussed herein relate to non-linear quantization of neural network parameters.

BACKGROUND

Neural network training may include models of analysis inspired by biological neural networks attempting to model high-level abstractions through multiple processing layers. Neural network analysis may consume large amounts of computing and/or network resources.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a method of generating a neural network. The method may include applying non-linear quantization to a plurality of synaptic weights of a neural network model. The method may also include training the neural network model. Further, the method may include generating a neural network output from the trained neural network model based on one or more inputs received by the trained neural network model.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
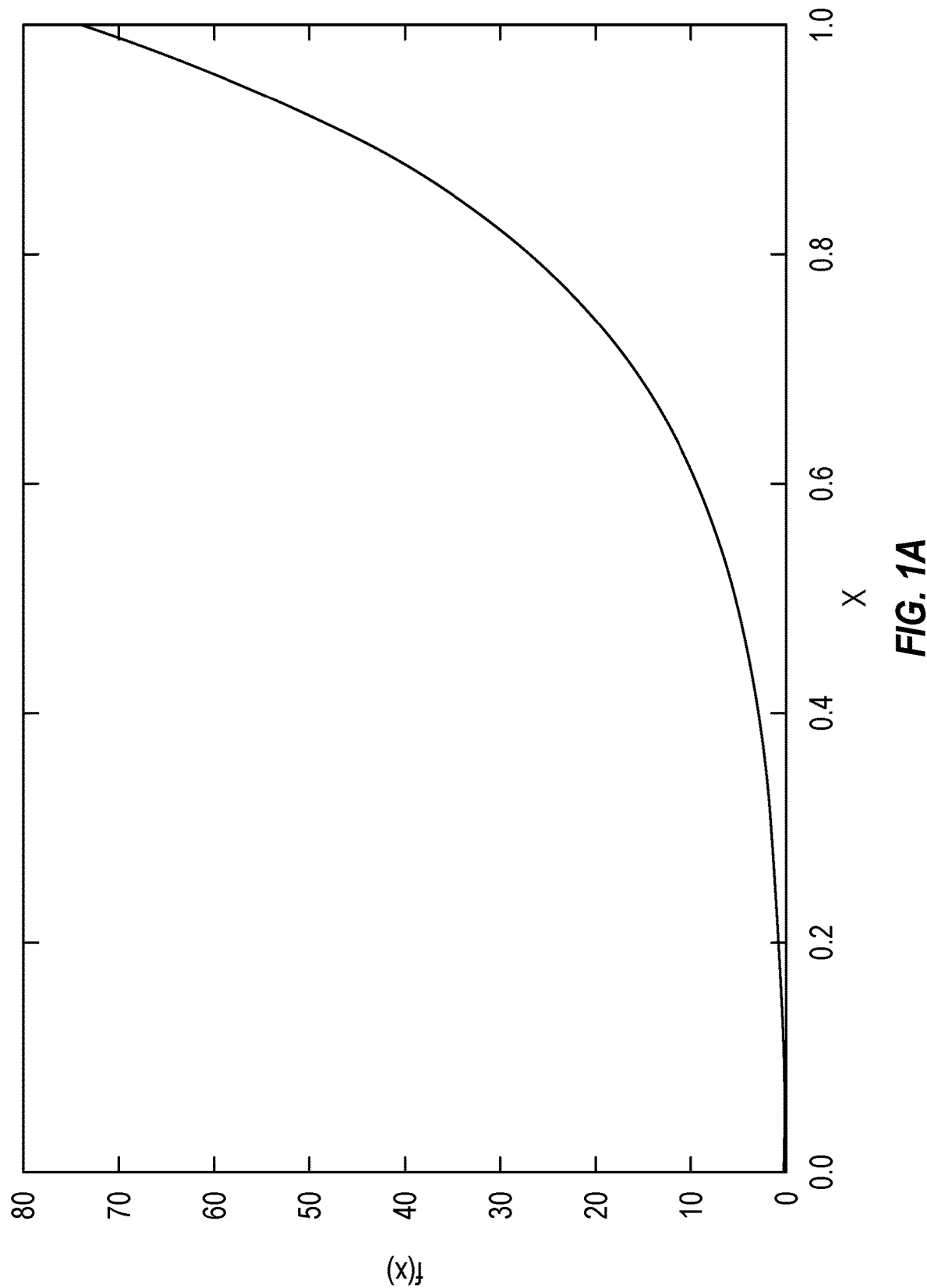
FIG. 1A is a plot of a non-linear function.

Various embodiments disclosed herein relate to quantization of neural networks. More specifically, according to some embodiments, a non-linear function may be applied to one or more parameters (e.g., synaptic weights) of one or more layers of one or more models of a neural network.

A neural network may include a model having a plurality of layers, and neurons within each layer may be communicatively coupled to neurons of adjacent layers via connections. More specifically, a neuron within a layer may be communicatively coupled to a neuron of an adjacent layer via a connection. Further, a connection between neurons of adjacent layers may be assigned a synaptic weight (e.g., a 32-bit value), which may be indicative of a strength or amplitude of the associated connection between neurons.

Neural networks are typically over-parameterized, and models within neural networks may include redundancy (e.g., redundancy of training parameters, such as synaptic weights). Further, generating and/or training neural networks (e.g., including one or more models) may require significant resources (e.g., processing requirements and/or memory). To reduce the redundancy, there has been various approaches, such as fixed point implementation for synaptic weights and/or activations, network pruning, and sharing weights (e.g., via a hash function).

Linear quantization may be used for neural network inference and/or training to reduce the computation costs, which may reduce the numeric precision for parameters. Further, quantization using logarithmic encoding may be used to reduce computation complexity converting multiplication to addition (e.g., $\log(x*y)=\log(x)+\log(y)$).

Some conventional methods of generating neural networks include increasing a number of bits in a neural network to provide a wider range and finer resolution. However, this may result in increased computation and memory requirements (e.g., due to processing elements with a larger number of bits, and an increased amount of data to be stored).

Further, some conventional methods of generating neural networks may minimize signal to quantization error of a distribution (SQNR). For example, at least one conventional method minimizes error for each single data. Although this may improve the efficiency of a deep-neural network (e.g., a deep neural network), it requires significate usage of a random number generator, which is very computationally expensive. Further, at least one other conventional method minimizes a total amount of error (e.g., $E=\Sigma m*\varepsilon$), wherein m is number of data quantized with a particular quantization level). This method, which requires a trained model, increases the costs of training the model.

Moreover, some conventional methods of generating neural networks, which consider smaller learned weights as less important compared to larger learned weights, may improve efficiency by pruning (e.g., setting connections with small weights to zero). However, these methods may require several loops of training, pruning, and fine tuning, thus the total cost of training a neural network is increased. Other methods may use logarithmic quantization, which penalizes larger values.

According to various embodiments, non-linear quantization may be used to improve the efficiency of the neural network. According to some embodiments, quantization may include course resolution (explained in further detail below) for low value inputs, and fine resolution (explained in further detail below) for high value inputs. Further, in various embodiments, a non-linear function that provides non-linear input-output characteristics may be utilized. Non-linear quantization (e.g., via a non-linear function) may increase the diversity of neural network parameters (e.g., synaptic weights). Example non-linear functions may include, but are not limited to, cos h(x) and sin h(x).

In contrast to some conventional systems and methods, which only reduce the error associated with data processed within neural networks, various embodiments may improve quantization characteristics (e.g., range and/or resolution) to provide sufficient accuracy in classification as an output of neural networks. For example, various embodiments relate to modifying (e.g., increasing or decreasing) a resolution via modifying (e.g., increasing or decreasing) a range of weight values and/or modifying (e.g., increasing or decreasing) a number of bits (e.g., a number of quantization levels) within the range.

Compared to conventional systems and methods, various embodiments of the present disclosure may reduce the number of bits (also referred to herein as a "number of quantization levels"), while providing sufficient resolution and covering a sufficient range. Accordingly, computational costs may be reduced. Further, instead of simply minimizing SQNR, various embodiments may include assigning more levels (e.g., more bits) to weights having greater values (e.g., more important parameters) to improve the accuracy of a neural network.

Thus, various embodiments of the present disclosure, as described more fully herein, provide a technical solution to one or more problems that arise from technology that could not reasonably be performed by a person, and various embodiments disclosed herein are rooted in computer technology in order to overcome the problems and/or challenges described above. Further, at least some embodiments disclosed herein may improve computer-related technology by allowing computer performance of a function not previously performable by a computer.

Various embodiments of the present disclosure may be utilized in various applications, such as Internet and Cloud applications (e.g., image classification, speech recognition, language translation, language processing, sentiment analysis recommendation, etc.), medicine and biology (e.g., cancer cell detection, diabetic grading, drug discovery, etc.), media and entertainment (e.g., video captioning, video search, real time translation, etc.), security and defense (e.g., face detection, video surveillance, satellite imagery, etc.), and autonomous machines (e.g., pedestrian detection, lane tracking, traffic signal detection, etc.).

Embodiments of the present disclosure are now explained with reference to the accompanying drawings.

Figure 1B:
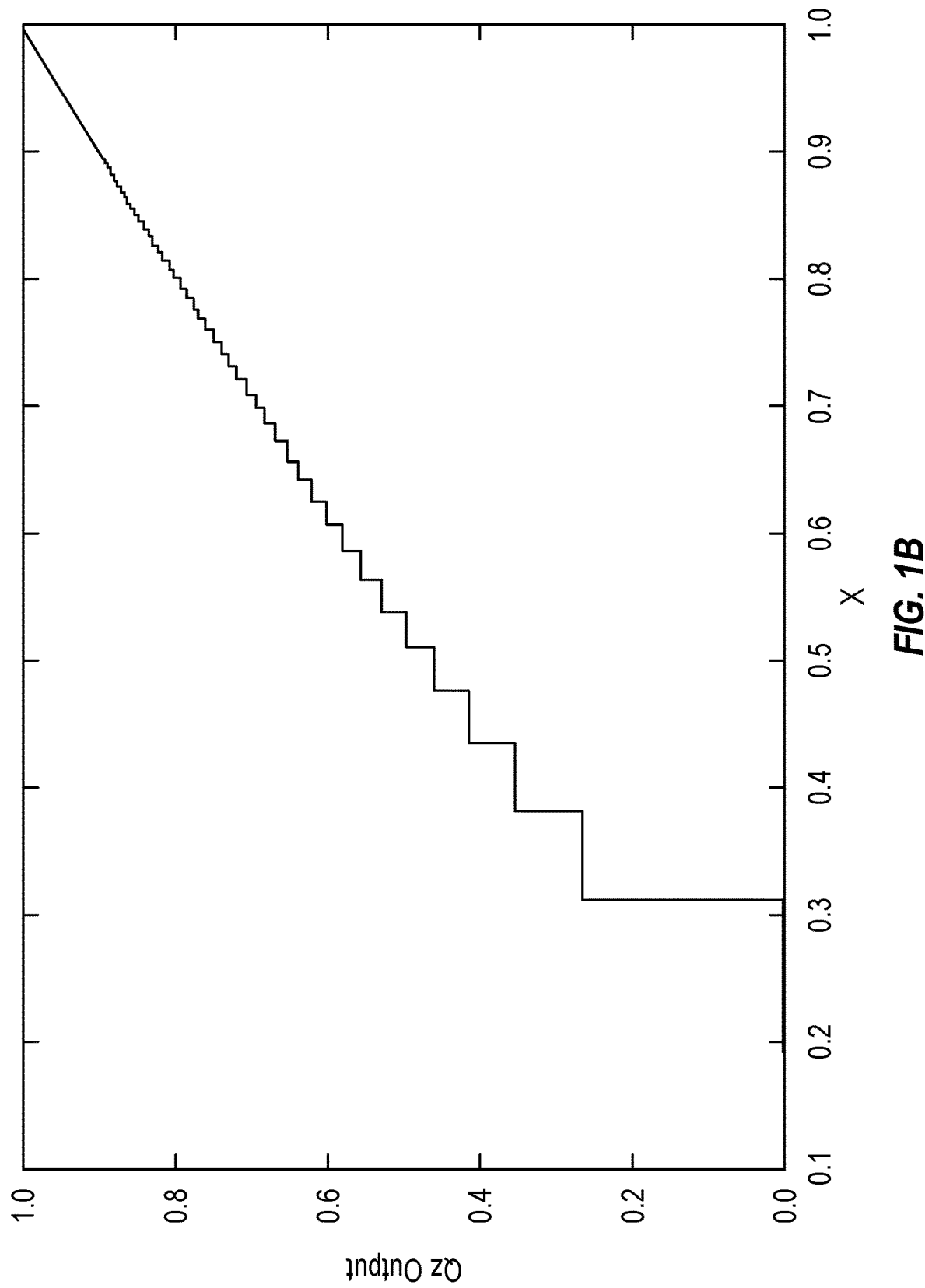
FIG. 1B is a plot depicting input-output characteristics of the non-linear function shown FIG. 1A.

FIG. 1A is a plot depicting an example non-linear function (e.g., $\cos h(x)-1$ ($x>=0$)). FIG. 1B is a plot depicting input-output characteristics for the function of FIG. 1A. As depicted in FIG. 1B, the function of FIG. 1A provides non-linear input-output characteristics.

Figure 2:
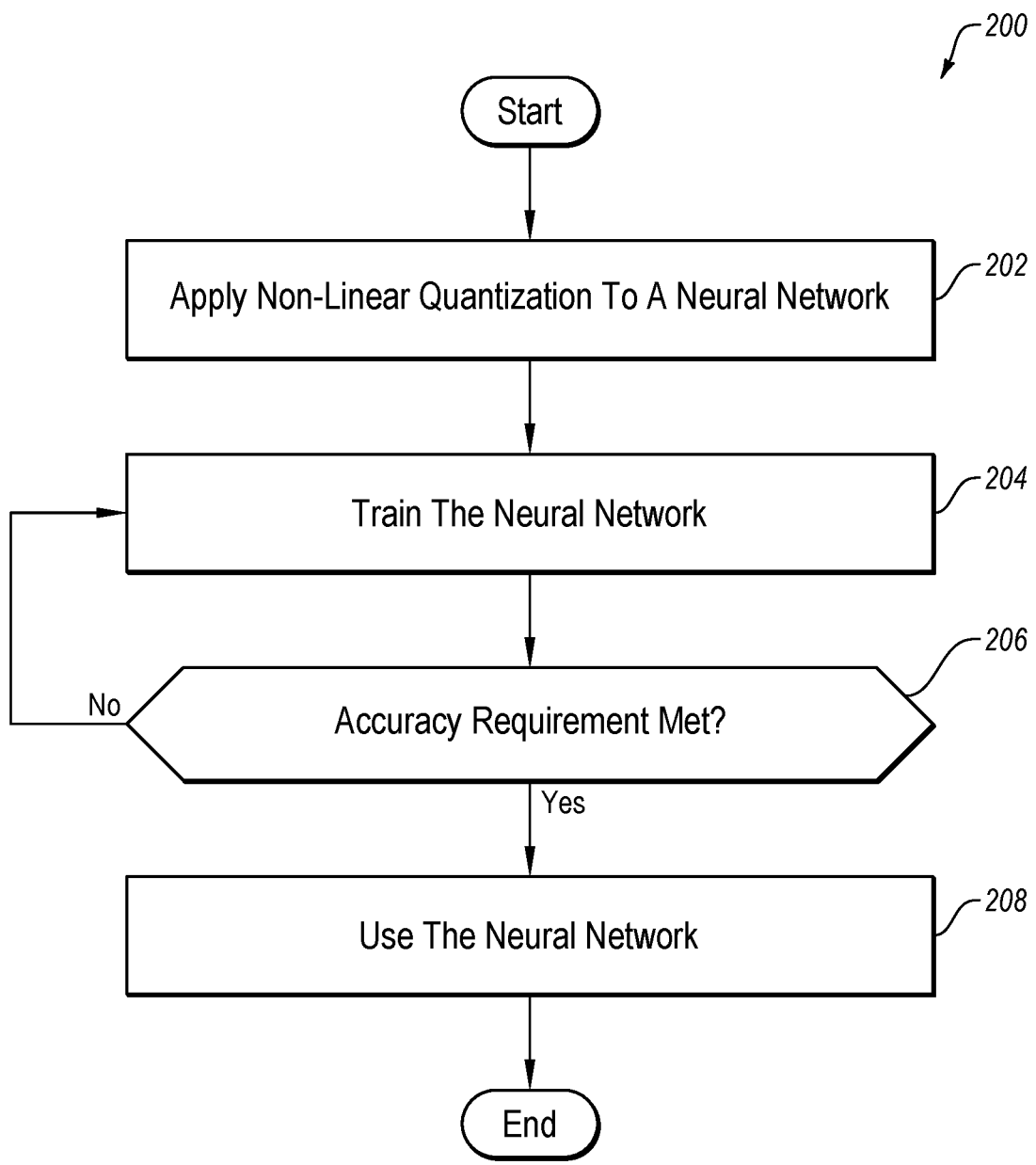
FIG. 2 is a flowchart of an example method of generating a neural network.

FIG. 2 is a flowchart of an example method 200 of generating a neural network, in accordance with at least one embodiment of the present disclosure. Method 200 may be performed by any suitable system, apparatus, or device. For example, a device 600 of FIG. 7 or one or more of the components thereof may perform one or more of the operations associated with method 200. In these and other embodiments, program instructions stored on a computer readable medium may be executed to perform one or more of the operations of method 200.

At block 202, a non-linear quantization may be applied to a neural network, and method 200 may proceed to block 204. More specifically, in at least some embodiments, a non-linear function, such as, but not limited to, $\cos h(x)$ and $\sin h(x)$, may be applied to at least one parameter of a model of a neural network. Yet more specifically, in at least some embodiments, a non-linear function may be applied to one or more synaptic weights (e.g., for neuron connections) of the neural network. Accordingly, a non-linear relationship may exist between the initial synaptic weight values and the quantized synaptic weight values. For example, processor 610 of FIG. 7 may apply the non-linear quantization to the neural network.

At block 204, the neural network may be trained, and method 200 may proceed to block 206. For example, the neural network including the model may be trained via, for example, conventional backpropagation with random initialization, and/or any other suitable training method. More specifically, one or more training parameters of each layer of the model may be trained. In some embodiments wherein a non-linear function has been applied to one or more synaptic weights, the one or more synaptic weights may be optimized via the training. As example, processor 610 of FIG. 7 may train the neural network.

At block 206, a determination may be made as to whether a required accuracy for the neural network has been met. For example, processor 610 of FIG. 7 may compare a threshold accuracy to a determined (e.g., measured) accuracy of the neural network to determine whether the accuracy of the neural network is meeting a required accuracy. If the required accuracy has been met, method 200 may proceed to block 208. If the required accuracy has not been met, method 200 may return to block 204.

At block 208, the neural network may be used. More specifically, for example, the neural network may receive one or more inputs (e.g., new data), and generate one or more outputs based on the trained model. For example, processor 610 of FIG. 7 may generate one or more outputs based on the trained model and the one or more received inputs.

Modifications, additions, or omissions may be made to method 200 without departing from the scope of the present disclosure. For example, the operations of method 200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 3:
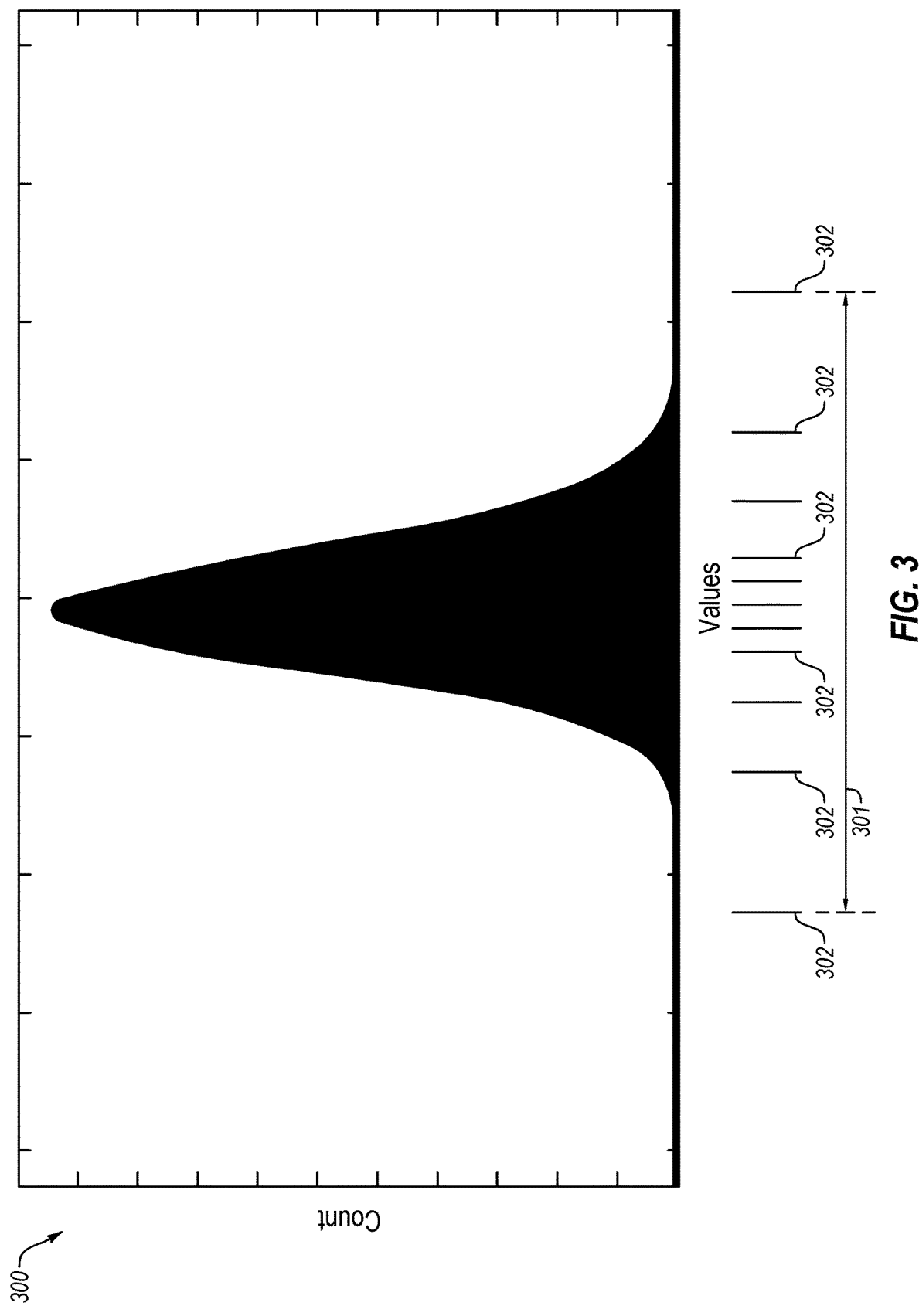
FIG. 3 depicts an example weight distribution for a range of quantization levels.

FIG. 3 is a plot 300 depicting an example weight distribution for a range 301 of quantization levels 302. A distance between each quantization level 302 may be indicative of a resolution of a quantization operation. As shown in plot 300, a resolution at the outer parts of range 301 is coarse (e.g., less quantization levels) and a resolution at the inner part of range 301 is a fine (e.g., more quantization levels). Thus, as used herein the phrase "coarse resolution" may relate to a first number of bits (e.g., N number of bits (e.g., lesser number of bits)) and the phrase "fine resolution" may relate to second, greater number of bits (e.g., M number of bits (e.g., greater number of bits)).

Various embodiments of the present disclosure may improve accuracy of neural networks by increasing a resolution for weights (e.g., layer inputs) having higher values (e.g. absolute values), and possibly decreasing a resolution for weights (e.g., layer inputs) having lower values (e.g. absolute values), as described herein. For example, according to various embodiments, course resolution quantization may be provided for inputs (e.g., weight values) of a lesser value (e.g., indicative of a low strength or amplitude of the associated connection), and fine resolution quantization may be provided for inputs (e.g., weight values) of higher value (e.g., indicative of a high strength or amplitude of the associated connection). For example, with reference again to FIG. 1B, as weight values (along the X-axis) increase, the resolution (e.g., a number of quantization levels) may also increase (e.g., from course resolution to fine resolution).

For example, according to at least one embodiment, pre-defined quantization levels may be used. A function f(x), such as cos h(x), sin h(x), may be used to provide suitable quantization levels via the following equation:

$$l_m = f^{-1}(m*d);$$

wherein $l_m$ is the $m^{th}$ quantization level, $f^{-1}$ is the inverse function of f(x), m is an integer, and d represents a distance between quantized outputs, and may have the following relationship:

$$f(\text{maximum range}) = (\text{maximum of } m)*d.$$

Figure 4:
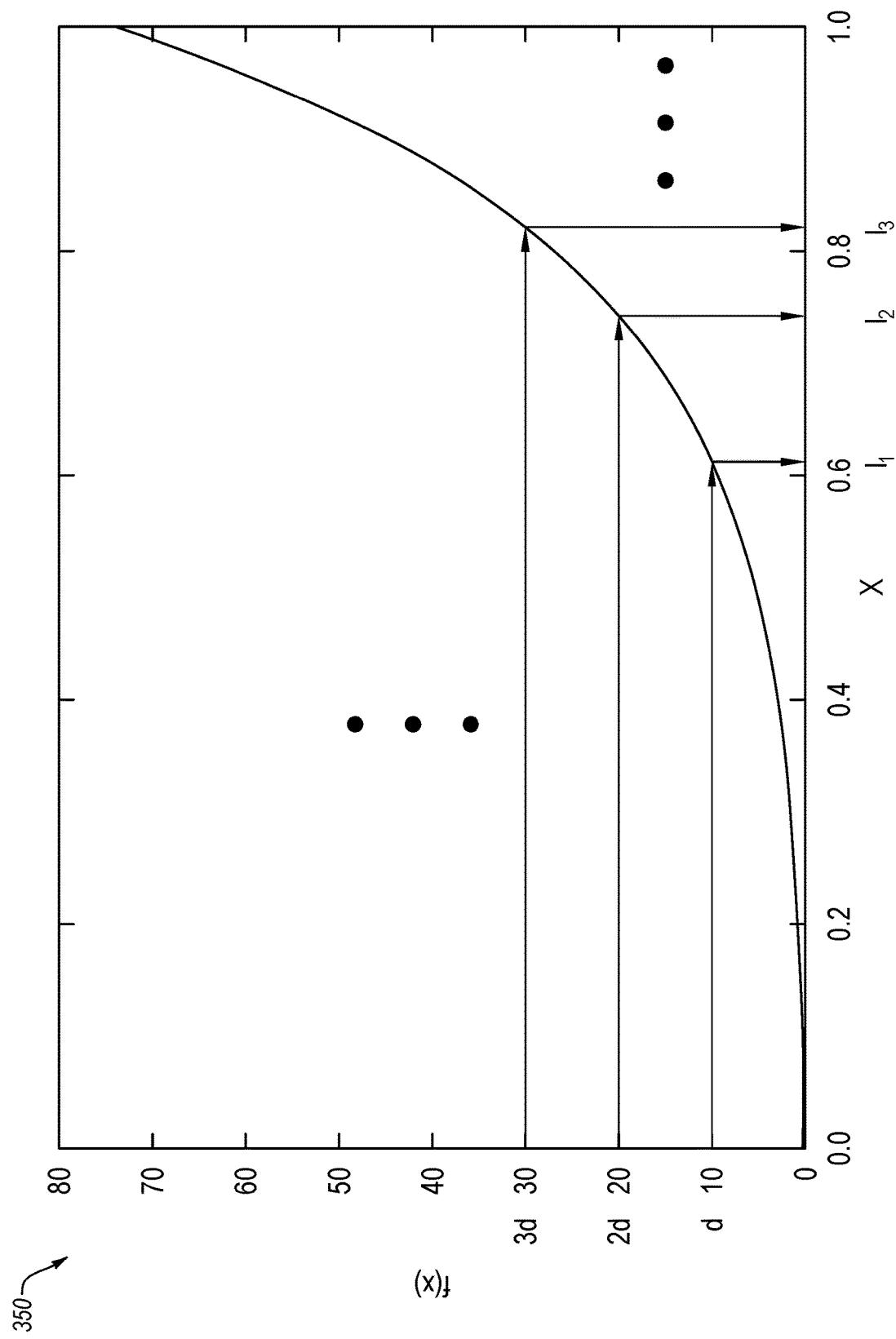
FIG. 4 is an example plot illustrating a function and quantization levels.

In some embodiments, distance d may be a fixed value. For example, in at least some embodiments, method 200 of FIG. 2 may be performed having pre-defined quantization levels (e.g., a fixed value of distance d and a fixed range). FIG. 4 is an example plot 350 illustrating a function f(x). In this example, f(x)=cos h(x)−1, wherein x>=0, or f(x)=−cos h(x)+1, wherein x<0. Plot 350 further includes quantization levels (e.g., $l_1$, $l_2$, $l_3$, etc.) and distance d, which, as noted above, is a distance between outputs (e.g., an output of a quantizer). In this example, distance d is a fixed value.

According to other embodiments, dynamic quantization levels may be used. For example, given a number of bits, a range and/or resolution may be enhanced via modifying distance d to meet a threshold (e.g., required and/or desired) accuracy.

Further, according to various embodiments, a resolution of quantization may be modified via, for example, modifying a range and/or modifying a number of bits (e.g., a number of quantization levels). More specifically, the resolution may be increased by decreasing the range and/or increasing the number of bits. In this example, the distance between quantization levels (e.g., distance d) may be decreased. Further, the resolution may be decreased by increasing the range and/or decreasing the number of bits. In this example, the distance between quantization levels (e.g., distance d) may be increased.

Figure 5:
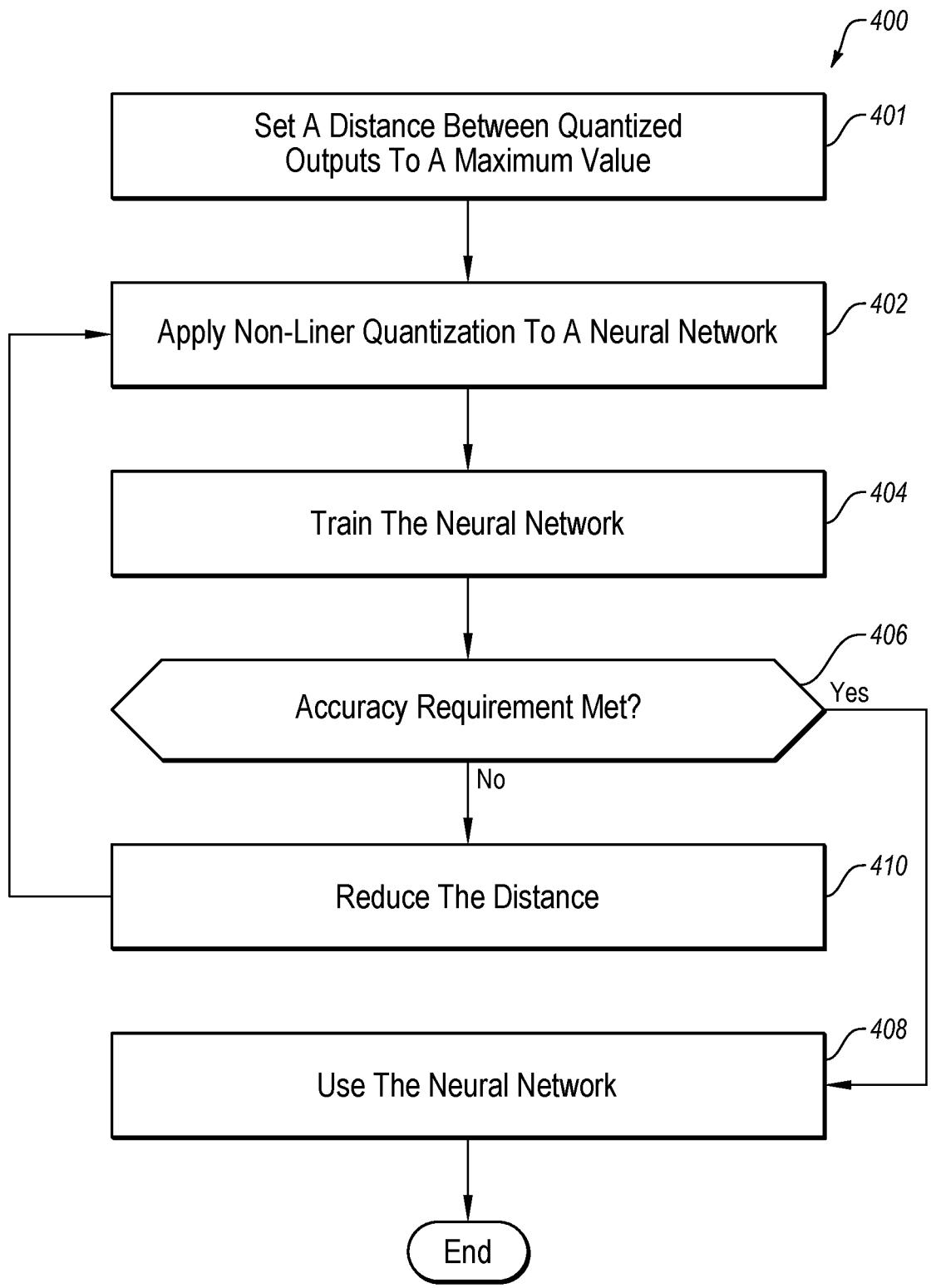
FIG. 5 is a flowchart of another example method of generating a neural network.

FIG. 5 is a flowchart of an example method 400 of generating a neural network, in accordance with at least one embodiment of the present disclosure. Method 400 may be performed by any suitable system, apparatus, or device. For example, device 600 of FIG. 7 or one or more of the components thereof may perform one or more of the operations associated with method 400. In these and other embodiments, program instructions stored on a computer readable medium may be executed to perform one or more of the operations of method 400.

At block 401, a distance between quantized outputs may be set to a maximum value, and method 400 may proceed to block 402. For example, processor 610 of FIG. 7 may set the distance between quantized outputs to a maximum value. For example, a range and/or a resolution for a parameter (e.g., synaptic weights) may be know, and the maximum value may be equal to the maximum distance in the neural network.

At block 402, non-linear quantization may be applied to a neural network, and method 400 may proceed to block 404. More specifically, in at least some embodiments, a non-linear function, such as, but not limited to, cos h(x) and sin h(x), may be applied to at least one parameter of a model of a neural network. Yet more specifically, in at least some embodiments, a non-linear function may be applied to one or more synaptic weights (e.g., for connections) of the neural network. For example, processor 610 of FIG. 7 may apply a non-linear quantization to the neural network.

At block 404, the neural network including the model may be trained, and method 400 may proceed to block 406. For example, the neural network may be trained via, for example, conventional backpropagation with random initialization, and/or any other suitable training method. More specifically, one or more training parameters of each layer of the model may be trained. In some embodiments wherein a non-linear function has been applied to one or more synaptic weights, the one or more synaptic weights may be optimized via the training. As example, processor 610 of FIG. 7 may train the neural network.

At block 406, a determination may be made as to whether a required accuracy has been met. For example, processor 610 of FIG. 7 may compare a threshold accuracy to a measured accuracy of the neural network to determine whether the neural network is meeting a required accuracy. If the required accuracy has been met, method 400 may proceed to block 408. If the required accuracy has not been met, method 400 may proceed to block 410.

At block 408, the neural network may be used. More specifically, for example, the neural network may receive one or more inputs (e.g., new data), and generate one or more outputs based on the trained model. For example, processor 610 of FIG. 7 may generate one or more outputs based on the trained model and the one or more received inputs.

At block 410, the distance between quantized outputs may be reduced, and method 400 may return to block 402. For example, the distance between quantized outputs (e.g., distance d) may be reduced by, for example, 1 unit, 2 units, 3 units, etc., to increase the resolution (e.g., and thus the accuracy of the neural network). For example, processor 610 of FIG. 7 may reduce the distance between quantized outputs.

Modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Further, in some embodiments, a range of values for the distance between quantized outputs may be used during neural network training. Further, for each value of the distance (e.g., distance d), an accuracy of the neural network may be measured and recorded. After each value for the distance is used, a determined optimal value for the distance (e.g., the value providing the highest accuracy) may be used while the neural network is used for inference.

Figure 6:
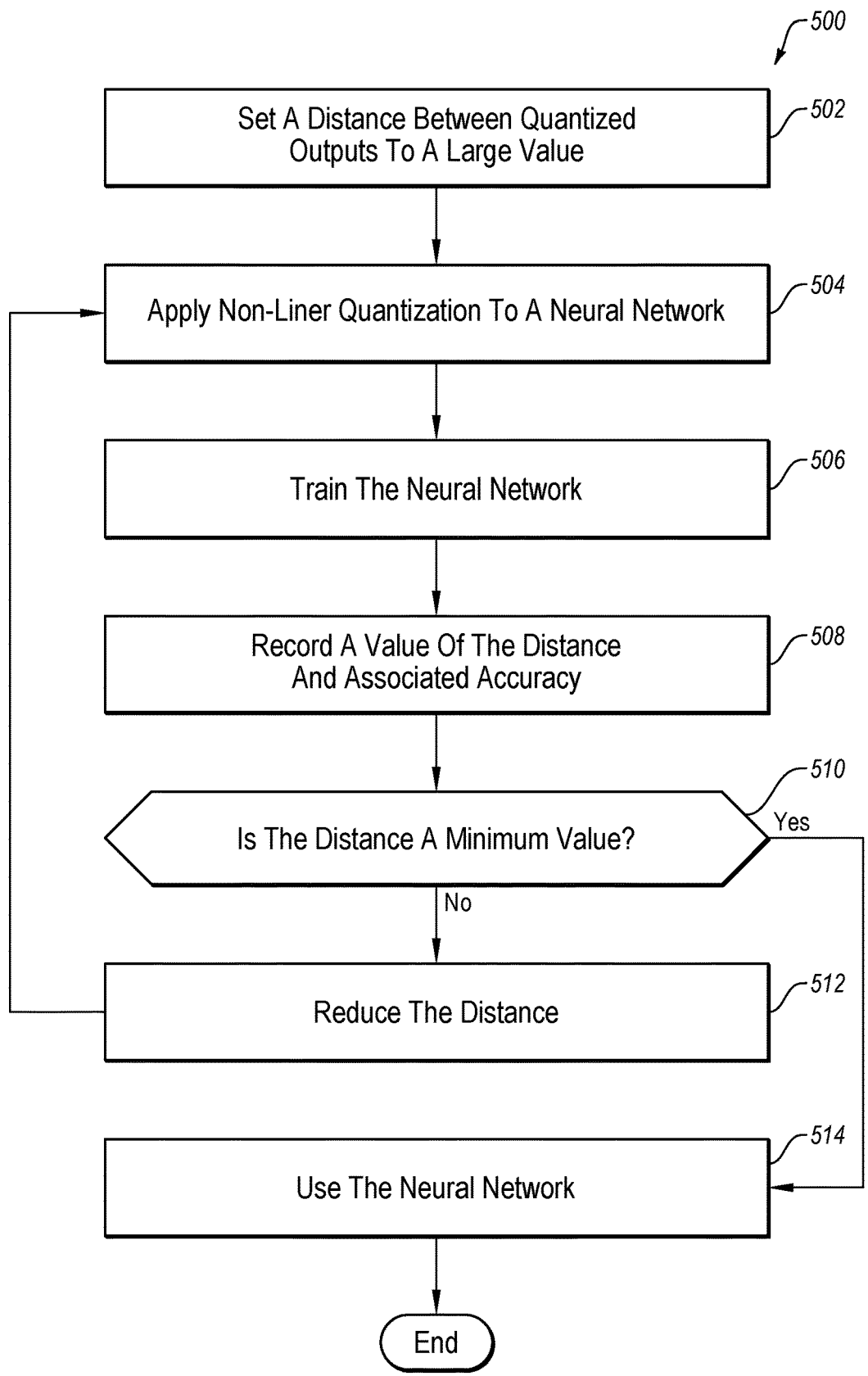
FIG. 6 is a flowchart of yet another example method of generating a neural network.

For example, FIG. 6 is a flowchart of an example method 500 of generating a neural network, in accordance with at least one embodiment of the present disclosure. Method 500 may be performed by any suitable system, apparatus, or device. For example, device 600 of FIG. 7 or one or more of the components thereof may perform one or more of the operations associated with method 500. In these and other embodiments, program instructions stored on a computer readable medium may be executed to perform one or more of the operations of method 500.

At block 502, a distance between quantized outputs may be set to a large value (e.g., a maximum value), and method 500 may proceed to block 504. For example, processor 610 of FIG. 7 may set the distance between quantized outputs (e.g., distance d) to a large value (e.g., maximum distance in the neural network).

At block 504, a non-linear quantization may be applied to a neural network, and method 500 may proceed to block 506. More specifically, in at least some embodiments, a non-linear function, such as, but not limited to, cos h(x) and sin h(x), may be applied to at least one parameter of a model of a neural network. Yet more specifically, in at least some embodiments, a non-linear function may be applied to one or more synaptic weights (e.g., for connections) of the neural network. For example, processor 610 of FIG. 7 may apply a non-linear quantization to the neural network.

At block 506, the neural network including the model may be trained, and method 500 may proceed to block 508. For example, the neural network may be trained via, for example, conventional backpropagation with random initialization, and/or any other suitable training method. More specifically, one or more training parameters of each layer of the model may be trained. In some embodiments wherein a non-linear function has been applied to one or more synaptic weights, the one or more synaptic weights may be optimized via the training. As example, processor 610 of FIG. 7 may train the neural network.

At block 508, the distance between quantized outputs and an associated measured accuracy of the neural network recorded, and method 500 may proceed to block 510. For example, processor 610 of FIG. 7 may measure an accuracy of the neural network using the distance between quantized outputs (e.g., distance d), and the measured accuracy and the value of the distance between quantized outputs may be recorded (e.g., in memory 630 of FIG. 7).

At block 510, a determination may be made as to whether the distance between quantized outputs is a minimum value. For example, processor 610 of FIG. 7 may determine whether the distance between quantized outputs (e.g., distance d) is a minimum value. For example, with digital implementation using, for example, an 8/16 bit integer (e.g., fixed point) the minimum value for the distance may be equal to 1. If the distance between quantized outputs is a minimum value, method 500 may proceed to block 514. If the distance between quantized outputs is greater than a minimum value, method 500 may proceed to block 512.

At block 512, the distance between quantized outputs may be reduced, and method 500 may return to block 504. For example, the distance between quantized outputs may be reduced by 1 unit, 2 units, 3 units, etc. For example, processor 610 of FIG. 7 may reduce distance d.

At block 514, the neural network may be used. More specifically, for example, the neural network may receive one or more inputs (e.g., new data), and generate one or more outputs based on the trained model. For example, processor 610 of FIG. 7 may generate one or more outputs based on the trained model.

Modifications, additions, or omissions may be made to method 500 without departing from the scope of the present disclosure. For example, the operations of method 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 7:
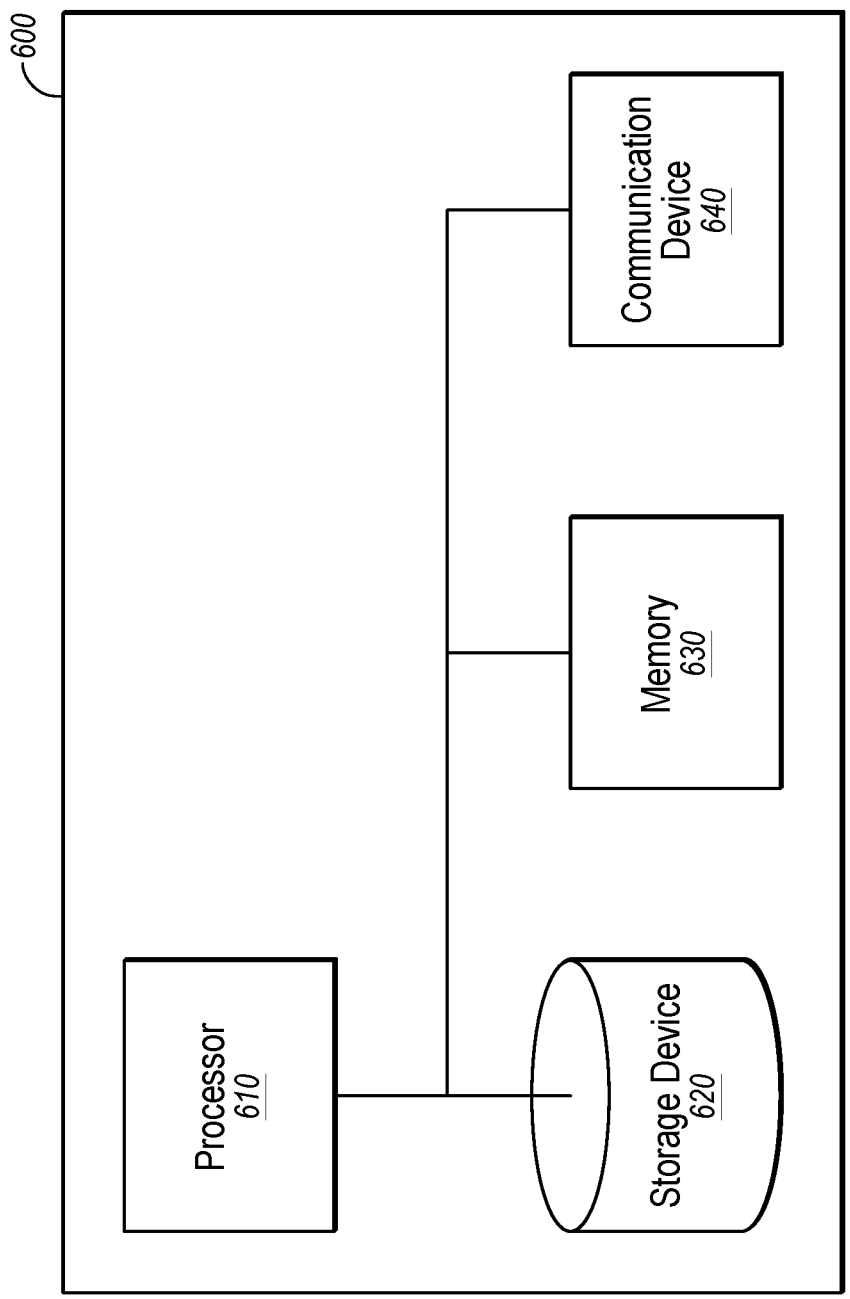
FIG. 7 is a block diagram of an example computing device.

FIG. 7 is a block diagram of an example computing device 600, in accordance with at least one embodiment of the present disclosure. Computing device 600 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing device 600 may include a processor 610, a storage device 620, a memory 630, and a communication device 640. Processor 610, storage device 620, memory 630, and/or communication device 640 may all be communicatively coupled such that each of the components may communicate with the other components. Computing device 600 may perform any of the operations described in the present disclosure.

In general, processor 610 may include any suitable special-purpose or general-purpose computer, computing entity, or processing device including various computer hardware or software modules and may be configured to execute instructions stored on any applicable computer-readable storage media. For example, processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 7, processor 610 may include any number of processors configured to perform, individually or collectively, any number of operations described in the present disclosure.

In some embodiments, processor 610 may interpret and/or execute program instructions and/or process data stored in storage device 620, memory 630, or storage device 620 and memory 630. In some embodiments, processor 610 may fetch program instructions from storage device 620 and load the program instructions in memory 630. After the program instructions are loaded into memory 630, processor 610 may execute the program instructions.

For example, in some embodiments one or more of processing operations for generating and/or training neural networks may be included in data storage 620 as program instructions. Processor 610 may fetch the program instructions of one or more of the processing operations and may load the program instructions of the processing operations in memory 630. After the program instructions of the processing operations are loaded into memory 630, processor 610 may execute the program instructions such that computing device 600 may implement the operations associated with the processing operations as directed by the program instructions.

Storage device 620 and memory 630 may include computer-readable storage media for carrying or having computer-executable instructions or data structures stored thereon. Such computer-readable storage media may include any available media that may be accessed by a general-purpose or special-purpose computer, such as processor 610. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

In some embodiments, storage device 620 and/or memory 630 may store data associated with generating neural networks, and more specifically, data associated with quantization of and/or training neural networks. For example, storage device 620 and/or memory 630 may store values for the distance between quantized outputs (e.g., distance d), neural network accuracy measurements, neural networks (e.g., models), etc.

Communication device 640 may include any device, system, component, or collection of components configured to allow or facilitate communication between computing device 600 and another electronic device. For example, communication device 640 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication device 640 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 7 without departing from the scope of the present disclosure. For example, computing device 600 may include more or fewer elements than those illustrated and described in the present disclosure. For example, computing device 600 may include an integrated display device such as a screen of a tablet or mobile phone or may include an external monitor, a projector, a television, or other suitable display device that may be separate from and communicatively coupled to computing device 600.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of operating a neural network, comprising applying, via at least one processor, non-linear quantization to a plurality of synaptic weights of a neural network model, wherein applying the non-li near quantization comprises:
   quantizing a first synaptic weight of the plurality of synaptic weights with a coarse resolution of N number bits in response to the first synaptic weight having a first value; and
   quantizing a second synaptic weight of the plurality of synaptic weights with a fine resolution of M number bits in response to the second synaptic weight having a second value, wherein M is greater than N and the second synaptic weight is quantized with M number of hits instead of N number of bits in response to the second value being greater than the first value;
   training, via the at least one processor, the neural network model; and
   generating, via the at least one processor, a neural network output from the trained neural network model based on one or more inputs received by the trained neural network model.

2. The method of claim 1, further comprising determining an accuracy of the neural network model, wherein the generating the neural network output comprises generating, in response to the determined accuracy being greater than a threshold accuracy, the neural network output.

3. The method of claim 1, wherein applying the non-linear quantization comprises applying a non-linear function to each synaptic weight of the plurality of synaptic weights of the neural network model.

4. The method of claim 3, wherein applying the non-linear function comprises applying one of a hyperbolic sine function and a hyperbolic cosine function to each synaptic weight of the plurality of synaptic weights.

5. The method of claim 1, further comprising:
determining an accuracy of the neural network model; and
increasing resolution of the neural network via increasing a number of bits of the non-linear quantization with respect to one or more of the synaptic weights in response to the determined accuracy being less than a threshold accuracy.

6. The method of claim 1, wherein applying the non-linear quantization comprises applying a non-linear function to the plurality of synaptic weights of the neural network model to generate non-uniformly distributed quantization levels.

7. The method of claim 1, wherein applying the non-linear quantization comprises applying a non-linear function to the plurality of synaptic weights of the neural network model to generate uniformly distributed quantization levels.

8. One or more non-transitory computer-readable media that include instructions that, when executed by one or more processors, are configured to cause the one or more processors to perform operations, the operations comprising:
applying non-linear quantization to a plurality of synaptic weights of a neural network model, wherein applying the non-linear quantization comprises:
quantizing a first synaptic weight of the plurality of synaptic weights with a coarse resolution of N number bits in response to the first synaptic weight having a first value; and
quantizing a second synaptic weight of the plurality of synaptic weights with a fine resolution of M number bits in response to the second synaptic weight having a second value, wherein M is greater than N and the second synaptic weight is quantized with M number of bits instead of N number of bits in response to the second value being greater than the first value;
training the neural network model; and
generating a neural network output from the trained neural network model based on one or more inputs received by the trained neural network model.

9. The computer-readable media of claim 8, the operations further comprising determining an accuracy of the neural network model, wherein the generating the neural network output comprises generating, in response to the determined accuracy being greater than a threshold accuracy, the neural network output.

10. The computer-readable media of claim 8, wherein applying the non-linear quantization comprises applying a non-linear function to each synaptic weight of the plurality of synaptic weights of the neural network model.

11. The computer-readable media of claim 10, wherein applying the non-linear function comprises applying one of a hyperbolic sine function and a hyperbolic cosine function to each synaptic weight of the plurality of synaptic weights.

12. The computer-readable media of claim 8, the operations further comprising:
determining an accuracy of the neural network model; and
increasing resolution of the neural network via increasing a number of bits of the non-linear quantization with respect to one or more of the synaptic weights in response to the determined accuracy being less than a threshold accuracy.

13. The computer-readable media of claim 8, wherein applying the non-linear quantization comprises applying a non-linear function to the plurality of synaptic weights of the neural network model to generate non-uniformly distributed quantization levels.

14. The computer-readable media of claim 8, wherein applying the non-linear quantization comprises applying a non-linear function to the plurality of synaptic weights of the neural network model to generate uniformly distributed quantization levels.

* * * * *